(12) United States Patent
S et al.

(10) Patent No.: US 8,605,629 B1
(45) Date of Patent: Dec. 10, 2013

(54) LAWFUL INTERCEPTION OF SUBSCRIBER RECEIVED MULTICAST TRAFFIC

(75) Inventors: Akhil S, Mysore (IN); Abhay Mehta, Bangalore (IN); Andrzej Szyszko, Holden, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 223 days.

(21) Appl. No.: 13/159,929

(22) Filed: Jun. 14, 2011

(51) Int. Cl.
*H04M 11/00* (2006.01)
*H04L 9/00* (2006.01)
*G06F 17/00* (2006.01)
*H04N 7/18* (2006.01)
*H04L 12/56* (2011.01)
*H04J 3/26* (2006.01)
*G06F 15/16* (2006.01)

(52) U.S. Cl.
USPC ........... 370/259; 370/230; 370/352; 370/466; 370/432; 379/93.02; 379/35; 726/4; 726/3; 726/12; 726/26; 725/74; 709/206

(58) Field of Classification Search
None
See application file for complete search history.

(56) References Cited

U.S. PATENT DOCUMENTS

| | | | |
|---|---|---|---|
| 7,549,160 B1 * | 6/2009 | Podar et al. | 726/4 |
| 7,657,011 B1 * | 2/2010 | Zielinski et al. | 379/93.02 |
| 8,155,137 B2 * | 4/2012 | Malledant et al. | 370/432 |
| 2006/0140213 A1 * | 6/2006 | Hwang et al. | 370/466 |
| 2006/0161625 A1 * | 7/2006 | Norp et al. | 709/206 |
| 2008/0168507 A1 * | 7/2008 | Teramoto et al. | 725/74 |

* cited by examiner

*Primary Examiner* — Andrew Chriss
*Assistant Examiner* — Ajit Reddy
(74) *Attorney, Agent, or Firm* — Harrity & Harrity, LLP (57) ABSTRACT

A network device may include a lawful interception module, a routing module, and a multicast distribution table. The lawful interception module may receive a lawful interception request for a subscriber, may inform the routing module about the subscriber, and may provide, to the routing module, a tap interface corresponding to the subscriber. The routing module may receive a multicast join request from the subscriber, and may insert, when the multicast join request is received, the tap interface in the multicast distribution table, as a forwarding interface.

20 Claims, 7 Drawing Sheets

LAWFUL INTERCEPTION OF SUBSCRIBER RECEIVED MULTICAST TRAFFIC

BACKGROUND

Communication networks typically include network devices, such as routers, which transfer or switch data from one or more sources to one or more destinations. For example, a network device may receive a packet from a source device (or another network device), may determine a destination for the packet, and may send an original or a modified packet to a destination device (or another network device). A law enforcement agency may request to obtain packets, or information associated with the packets, sent or received by a particular target device. Such activity may be identified as lawful interception. Lawful interception is the legally sanctioned official access to private communications, such as telephone calls or email messages. The law enforcement agency may send a request to a network device to obtain data associated with a target device (e.g., utilized by a subscriber) and the network device may establish a lawful interception session associated with the target device.

Internet protocol (IP) multicast is a method of sending IP packets to a group of interested subscribers in a single transmission. IP multicast may be employed for streaming media applications on the Internet and private networks. However, network devices are unable to perform lawful interception of multicast traffic (e.g., packets) received by a particular subscriber since a multicast packet does not contain any subscriber specific information. A multicast packet contains a multicast group address in a destination address of the packet, rather than a destination address of the particular subscriber. A multicast group subscription request may be generated by a subscriber based on the Internet group management protocol (IGMP). A particular multicast group stream may be sent to the subscriber based on the IGMP subscription request.

One proposed method to perform lawful interception of multicast traffic received by a particular subscriber involves using another device (e.g., a mediation device) in addition to a network device. The mediation device may monitor IGMP requests by the particular subscriber by intercepting the IGMP requests using a source address of the particular subscriber provided in the IGMP requests. Once an IGMP request is received, the mediation device may send, to the network device, an explicit request to intercept multicast traffic requested by the particular subscriber. However, such a method requires a secondary device (e.g., the mediation device) to monitor the IGMP requests, and requires the mediation device to send a request to the network device to lawfully intercept the multicast traffic. Furthermore, the mediation device will not know whether the multicast traffic was actually delivered to the particular subscriber.

Another proposed method to perform lawful interception of multicast traffic received by a particular subscriber involves using a special service card, in the network device, to intercept the multicast traffic. However, even after streaming the multicast traffic to a service packet interface card (PIC), this method requires additional filtering to retrieve traffic relevant to the particular subscriber.

SUMMARY

According to one aspect, a method, performed by a network device, may include receiving, by a lawful interception module of the network device, a lawful interception request for a subscriber, and informing, by the lawful interception module, a routing module of the network device about the subscriber. The method may also include providing, by the lawful interception module and to the routing module, an interface (a tap interface) corresponding to the subscriber, and receiving, by the routing module, a multicast join request from the subscriber. The method may further include inserting, by the routing module and when the multicast join request is received, the tap interface in a multicast distribution table, of the network device, as a forwarding interface.

According to another aspect, a network device may include a multicast distribution table, a routing module, and a lawful interception module. The lawful interception module may receive a lawful interception request for a subscriber, may inform the routing module about the subscriber based on the lawful interception request, and may provide, to the routing module, an interface corresponding to the subscriber. The routing module may receive a multicast join request from the subscriber, and may insert, when the multicast join request is received, the interface in the multicast distribution table, as a forwarding interface.

According to still another aspect, one or more non-transitory computer-readable media may store instructions executable by one or more processors of a network device that includes a lawful interception module, a routing module, and a multicast distribution table. The media may include one or more instructions to receive, by the lawful interception module, a lawful interception request for a subscriber, and one or more instructions to inform, by the lawful interception module, the routing module about the subscriber based on the lawful interception request. The media may also include one or more instructions to provide, by the lawful interception module and to the routing module, an interface corresponding to the subscriber, and one or more instructions to receive, by the routing module, a multicast join request from the subscriber. The media may further include one or more instructions to insert, by the routing module and when the multicast join request is received, the interface in the multicast distribution table, as a forwarding interface.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Systems and/or methods described herein may perform lawful interception of multicast traffic received by a particular subscriber via a network device. The network device may include a lawful interception module and a routing module. In order to intercept a multicast stream received by the particular subscriber, the lawful interception module may receive an explicit request to intercept a particular multicast stream or the lawful interception module may interact with the routing module to obtain information related to an IGMP join request by the particular subscriber.

In an example implementation, the lawful interception module, of the network device, may receive a lawful interception request for a subscriber, and may inform the routing module about the subscriber being intercepted. The lawful interception module may provide an interface (e.g., a tap interface), corresponding to the subscriber, to the routing module, and the routing module may receive a multicast join request from the subscriber. When the multicast join request is received, the routing module may insert the tap interface, as a forwarding interface, in a multicast distribution table provided in the network device. The network device may receive multicast traffic provided to or received from the subscriber, and may provide a copy of the multicast traffic to a mediation device based on the forwarding interface provided in the multicast distribution table.

Figure 1:
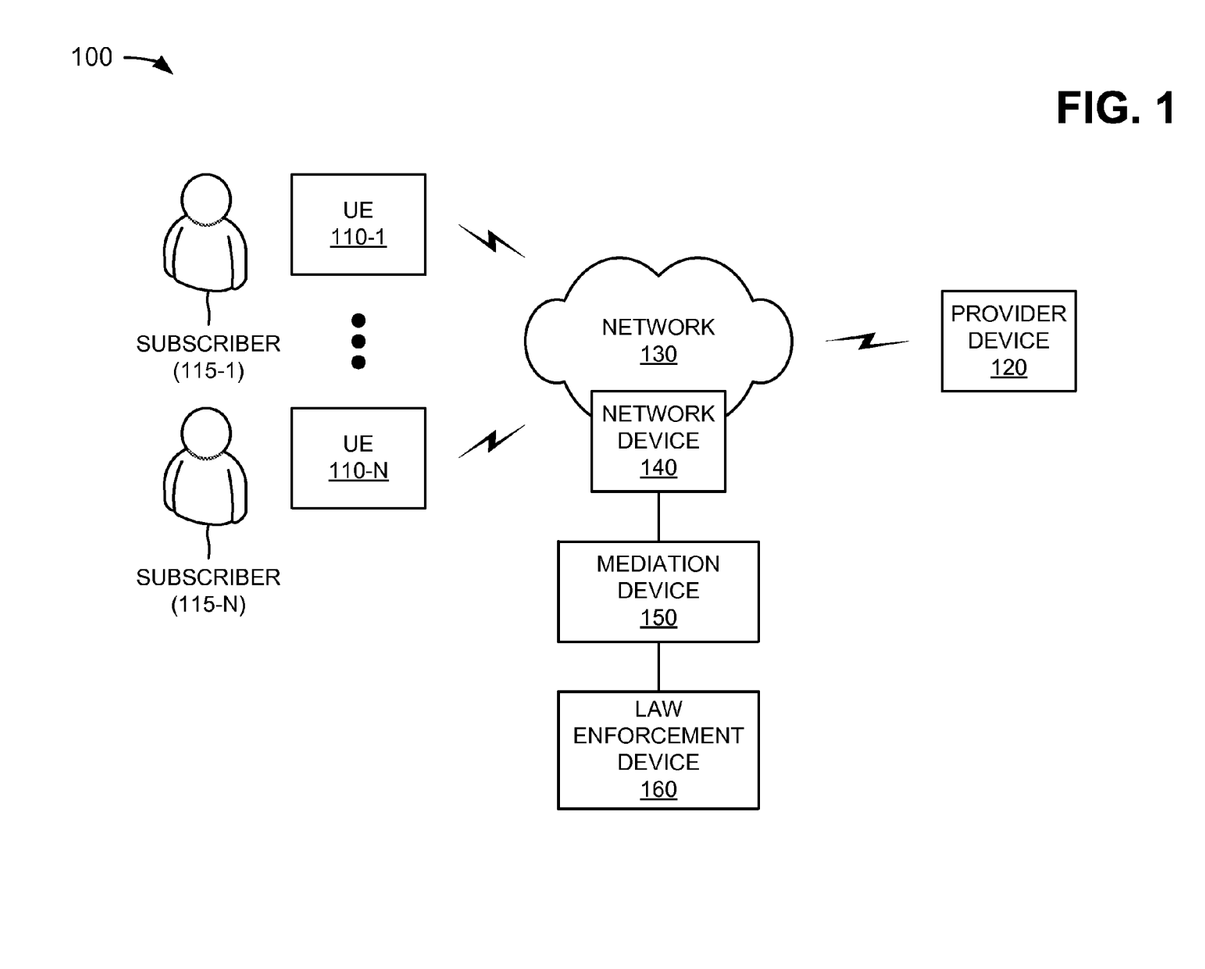
FIG. 1 is a diagram of an example network in which systems and/or methods described herein may be implemented.

FIG. 1 is a diagram of an example network 100 in which systems and/or methods described herein may be implemented. As illustrated, network 100 may include a number of user equipment (UE) 110-1, . . . , 110-N (collectively referred to herein as "UEs 110," and, in some instances, singularly as "UE 110") associated with subscribers 115-1, . . . , 115-N (collectively referred to herein as "subscribers 115," and, in some instances, singularly as "subscriber 115"); a provider device 120; a network 130; a network device 140; a mediation device 150; and a law enforcement device 160. One or more of the devices of network 100 may interconnect via wired and/or wireless connections.

Two UEs 110, two subscribers 115, one provider device 120, one network 130, one network device 140, one mediation device 150, and one law enforcement device 160 have been illustrated in FIG. 1 for simplicity. In practice, there may be more UEs 110, subscribers 115, provider devices 120, networks 130, network devices 140, mediation devices 150, and/or law enforcement devices 160. Also, in some instances, one or more of the devices of network 100 may perform one or more tasks described as being performed by another one or more of the devices of network 100.

UE 110 may include any user device with a communication function, such as a portable communication device (e.g. a mobile phone, a smart phone, a tablet computer, a global positioning system (GPS) device, and/or another type of wireless device); a content recording device (e.g., a camera, a video camera, etc.); a gaming system; a personal computer or workstation; a server device; a portable computer; a voice over Internet Protocol (VoIP) telephone device; a radiotelephone; a set-top box (STB); a television; and/or any type of user device capable of communicating with network 130.

Subscriber 115 may include one or more persons, associated with UE 110, that subscribe to resources provided by provider device 120. In one implementation, subscriber 115 may include UE 110 or a user of UE 110. The term resources, as used herein, is intended to be broadly construed to include content, such as video, audio, images, software downloads, etc.; services, such as delivering high-definition and user-generated content, consumer and business news and information services, an email system, etc.; and/or a combination of content and services. In one example, subscriber 115 may subscribe to unicast traffic (e.g., over the top (OTT) content) and/or multicast traffic (e.g., IP television) provided by provider device 120. OTT video content may include, for example, pre-recorded video content (e.g., television episodes), and content associated with video portals provided by content providers, such as Hulu™, YouTube™, CNN, etc.

Provider device 120 may include one or more server devices, or other types of computation or communication devices, that gather, process, search, and/or provide information in a manner described herein. In one example implementation, provider device 120 may include resources that may be accessed by UEs 110 via network 130 and/or network device 140. In one example, UE 110 may connect to provider device 120, and may request some resource available from provider device 120. Provider device 120 may evaluate the request (e.g., according to filtering rules, such as filtering traffic by IP address or protocol). If the request is validated, provider device 120 may provide the requested resource to UE 110.

Network 130 may include one or more of a same type of packet-switched networks, or one or more packet-switched networks of different types. A "packet" may refer to a packet, a datagram, or a cell; a fragment of a packet, a fragment of a datagram, or a fragment of a cell; or another type, arrangement, or packaging of data. For example, network 130 may include one or more of a local area network (LAN), a wide area network (WAN), a metropolitan area network (MAN), an optical network, a cable television network, a satellite television network, a wireless network (e.g., a Code Division Multiple Access (CDMA) network, a general packet radio service (GPRS) network, and/or a Long Term Evolution (LTE) network), an ad hoc network, a telephone network (e.g., the Public Switched Telephone Network (PSTN) or a cellular network), an intranet, the Internet, or a combination of these networks or other types of networks.

Network device 140 may include any device that receives and transmits packets within a network or between networks. In one implementation, network device 140 may be enabled for lawful interception. Network device 140 may include, for example, a gateway, a router, a switch, a firewall, a network interface card (NIC), a hub, a bridge, a proxy server, an optical add-drop multiplexer (OADM), a broadband remote access server (BRAS), or some other type of device (e.g., a layer 2 and/or layer 3 device) that processes and/or transfers traffic (e.g., packets). Network device 140 may include one or more ingress interfaces and one or more egress interfaces. Network device 140 may receive a packet at one of the ingress interfaces, determine a destination of the received packet, determine an egress interface based on the determined destination, and forward the packet via the determined egress interface. In one example, network 130 and/or network device 140 may function as a link between UE 110 and provider device 120.

Mediation device 150 may include one or more computation or communication devices that gather, process, search, and/or provide information in a manner described herein. Mediation device 150 may receive provisioning information from law enforcement device 160. The provisioning information may identify one or more subscribers 115 for which to perform lawful interception. Mediation device 150 may send a request to initiate a lawful interception session to network device 140, and may receive information associated with the lawful interception session from network device 140.

Law enforcement device 160 may include one or more computation or communication devices that gather, process, search, and/or provide information in a manner described herein. For example, law enforcement device 160 may include one or more devices associated with a law enforcement agency, or associated with another person or entity authorized to monitor packets moving through network device 140 (such as, for example, an administrator of network device 140). In one example, an operator associated with the law enforcement agency may request a tap to be placed on a particular phone number associated with a subscriber 115 (e.g., and corresponding UE 110). The operator may generate a request for the tap using law enforcement device 160, and law enforcement device 160 may send the request for the tap to mediation device 150. Mediation device 150 may generate a request for a lawful interception session based on target information associated with the particular phone number.

Although FIG. 1 shows example devices of network 100, in other implementations, network 100 may include fewer devices, different devices, differently arranged devices, or additional devices than depicted in FIG. 1.

Figure 2:
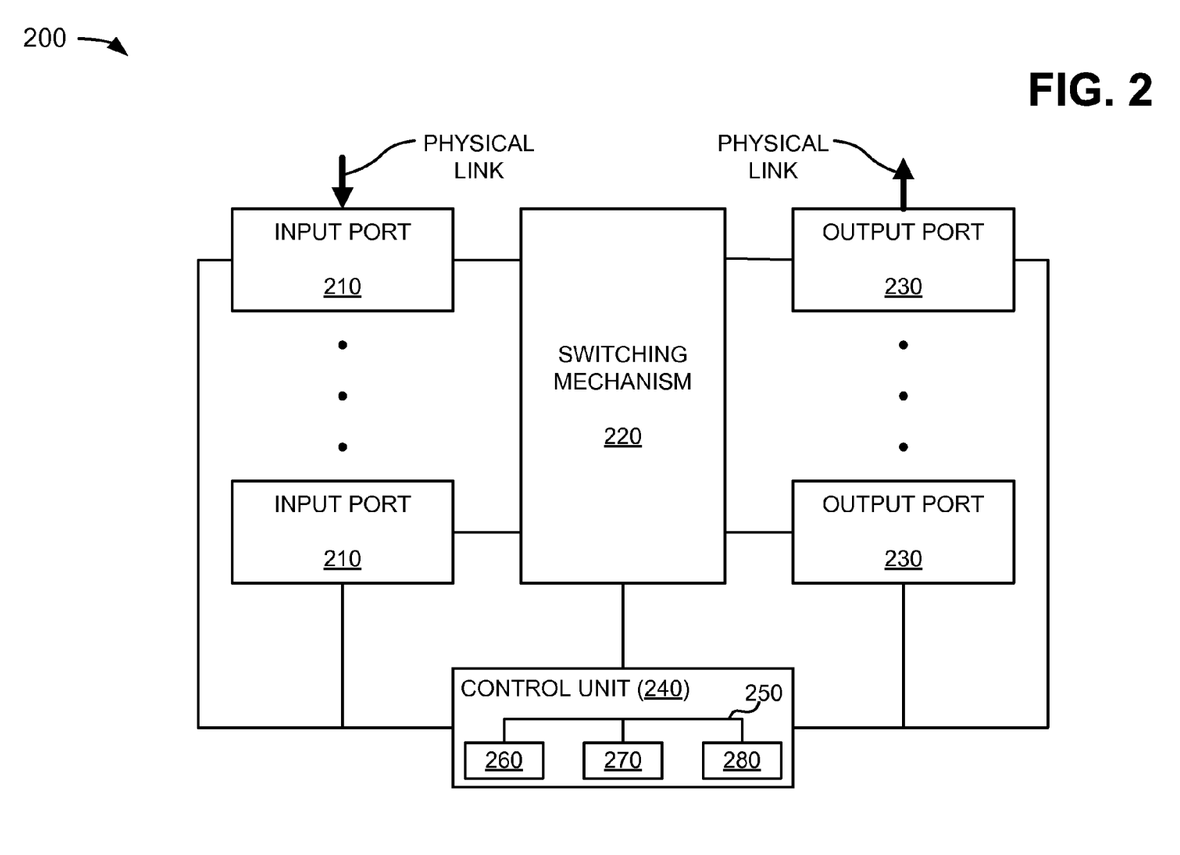
FIG. 2 is a diagram of example components of a network device depicted in FIG. 1.

FIG. 2 is a diagram of example components of a device 200 that may correspond to network device 140 (FIG. 1). In some instances, network device 140 may include one or more devices 200. As shown in FIG. 2, device 200 may include input ports 210, a switching mechanism 220, output ports 230, and a control unit 240.

Input ports 210 may be a point of attachment for physical links and may be a point of entry for incoming traffic, such as packets. Input ports 210 may carry out data link layer encapsulation and decapsulation. In an example implementation, input ports 210 may send and/or receive packets.

Switching mechanism 220 may interconnect input ports 210 with output ports 230. Switching mechanism 220 may be implemented using many different techniques. For example, switching mechanism 220 may be implemented via busses, crossbars, and/or with shared memories which may act as temporary buffers to store traffic from input ports 210 before the traffic is eventually scheduled for delivery to output ports 230.

Output ports 230 may store packets and may schedule packets for service on output physical links. Output ports 230 may include scheduling algorithms that support priorities and guarantees. Output ports 230 may support data link layer encapsulation and decapsulation, and/or a variety of higher-level protocols. In an example implementation, output ports 230 may send packets and/or receive packets.

Control unit 240 may use routing protocols and one or more forwarding tables for forwarding packets. Control unit 240 may connect with input ports 210, switching mechanism 220, and output ports 230. Control unit 240 may compute a forwarding table, implement routing protocols, and/or run software to configure and manage device 200. Control unit 240 may handle any packet whose destination address may not be found in the forwarding table.

In an example implementation, control unit 240 may include a bus 250 that may include a path that permits communication among a processor 260, a memory 270, and a communication interface 280. Processor 260 may include one or more processors, microprocessors, application-specific integrated circuit (ASICs), field-programmable gate arrays (FPGAs), or other types of processing units that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Memory 270 may also temporarily store incoming traffic (e.g., a header of a packet or an entire packet) from input ports 210, for processing by processor 260, before a packet is directed back to switching mechanism 220, queued in switching mechanism 220, and eventually scheduled to be sent to output ports 230. Communication interface 280 may include any transceiver-like mechanism that enables control unit 240 to communicate with other devices and/or systems.

Device 200 may perform certain operations, as described herein. Device 200 may perform these operations in response to processor 260 executing software instructions contained in a computer-readable medium, such as memory 270. A computer-readable medium may be defined as a non-transitory memory device. A memory device may include space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
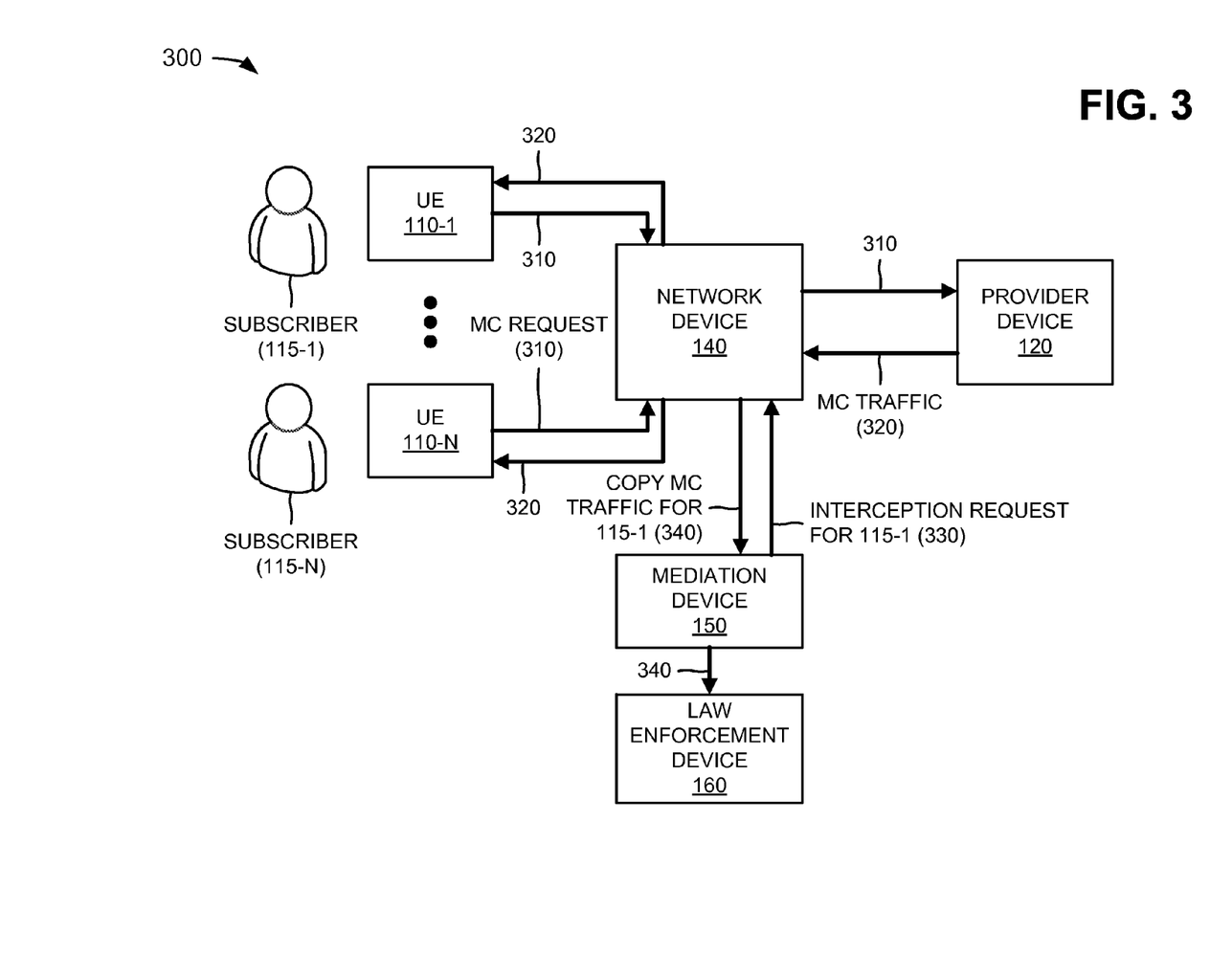
FIG. 3 is a diagram of example operations capable of being performed by an example portion of the network illustrated in FIG. 1.

FIG. 3 is a diagram of example operations capable of being performed by an example portion 300 of network 100. As shown in FIG. 3, example network portion 300 may include UEs 110, subscribers 115, provider device 120, network device 140, mediation device 150, and law enforcement device 160. UEs 110, subscribers 115, provider device 120, network device 140, mediation device 150, and law enforcement device 160 may include the features described above in connection with, for example, one or more of FIGS. 1 and 2.

As shown in FIG. 3, subscribers 115 may generate, via UEs 110, requests 310 for multicast (MC) traffic (e.g., packets). In one example implementation, MC requests 310 may include IGMP-based join requests for multicast traffic. IGMP is a communications protocol used by host devices and adjacent network devices on IP networks to establish multicast group memberships. IGMP can be used for online streaming of video and games, and may permit more efficient use of resources when supporting these types of applications. IGMP may be used if network 130 is an IP version 4 (IPv4) type network. In another example implementation, MC requests 310 may include Internet Control Message Protocol (ICMP)-based requests for multicast content. ICMP may be used if network 130 is an IP version 6 (IPv6) type network.

UEs 110 may provide MC requests 310 to network device 140, and network device 140 may provide MC requests 310 to provider device 120. Provider device 120 may receive MC requests 310, and may determine, based on information provided in MC requests 310 (e.g., multicast traffic requested by MC requests 310, whether subscribers 115 are authorized to receive the requested multicast traffic, etc.), whether the multicast traffic requested by MC requests 310 is stored in provider device 120. If the multicast traffic requested by MC requests 310 is stored in provider device 120, and subscribers 115 are authorized to receive the requested multicast content, provider device 120 may provide multicast traffic 320 to network device 140. Network device 140, in turn, may provide multicast traffic 320 to UEs 110, and UEs 110 may provide (e.g., output) multicast traffic 320 to subscribers 115. In one example, multicast traffic 320 may include content, such as video, audio, images, software downloads, IP television, etc., provided by provider device 120.

As further shown in FIG. 3, mediation device 150 may provide an interception request 330 for a particular subscriber (e.g., subscriber 115-1) to network device 140. Interception request 330 may include a request to perform lawful interception of some or all traffic (e.g., unicast traffic and multicast traffic) flowing to and from subscriber 115-1, via UE 110-1. Interception request 330 may also include subscriber specific information, such as a name, an address, a telephone number, an account number, etc. associated with subscriber 115-1; information associated with UE 110-1 of subscriber 115-1, such as a device type, a telephone number, an IP address, etc. associated with UE 110-1; etc.

As described below in connection with FIG. 4, network device 140 may include a lawful interception module, a routing module, and a multicast distribution table. The lawful interception module of network device 140 may receive interception request 330, and may inform the routing module about the subscriber (e.g., subscriber 115-1) identified in interception request 330. The lawful interception module may also provide an interface, corresponding to subscriber 115-1, to the routing module. In one example, the interface may direct a copy of traffic, provided to or from subscriber 115-1, to mediation device 150. In one implementation, the interface may include a tap interface, a tun interface, etc. A tap interface is a software-only interface, with no physical hardware component, that may forward traffic to a destination. In one example, a tap interface may simulate an Ethernet device and may operate on layer 2 packets, such as Ethernet frames. A tun (or tunnel) interface is a software-only interface, with no physical hardware component, that may forward traffic to a destination. In one example, a tun interface may simulate a network layer device and may operate on layer 3 packets, such as IP packets.

When the routing module of network device 140 receives a multicast request 310 (e.g., an IGMP join request) from subscriber 115-1, the routing module may insert the interface, corresponding to subscriber 115-1, as an outgoing or forwarding interface of the multicast distribution table. If network device 140 receives multicast traffic 320 provided to or from subscriber 115-1, via UE 110-1, network device 140 (e.g., via the multicast distribution table) may provide a copy 340 of multicast traffic 320 to the interface provided in the multicast distribution table. Network device 140 (e.g., via the interface) may add subscriber specific information, such as headers, to multicast traffic copy 340, and may forward multicast traffic copy 340 to mediation device 150. Mediation device 150 may forward multicast traffic copy 340 to law enforcement device 160, and law enforcement device 160 may perform further lawful interception processing on multicast traffic copy 340.

Unlike prior methods, the arrangement depicted in FIG. 3 may enable the lawful interception module of network device 140 to inform the routing module about a subscriber being intercepted, and may enable the routing module to utilize the interface in the multicast distribution table to mirror multicast traffic upon receiving a multicast join request from a subscriber. Thus, network device 140 may perform lawful interception of multicast groups in which a particular subscriber is interested, rather than only the multicast groups. Since interception request 330 may request network device 140 to perform lawful interception of all traffic (e.g., unicast traffic and multicast traffic) flowing to and from the particular subscriber, network device 140 may perform lawful interception (i.e., tap) of multicast groups in which the particular subscriber is interested via the routing module of network device 140.

The arrangement depicted in FIG. 3, unlike prior methods, does not require mediation device 150 to send a separate request, with specific multicast group information, to intercept multicast traffic being received by a subscriber 115. Rather, network device 140 may intercept and send multicast traffic to mediation device 150 on a per subscriber basis, with subscriber specific headers. Network device 140 may perform the lawful interception of multicast traffic, for a particular subscriber 115, without the need for external equipment to snoop multicast requests 310 sent by subscriber 115 and without the need to send a separate interception request for multicast traffic. Rather, network device 140 may begin a lawful interception of multicast traffic, for a particular subscriber 115, when the particular subscriber 115 joins a multicast group.

Although FIG. 3 shows example components of network portion 300, in other implementations, network portion 300 may include fewer components, different components, differently arranged components, or additional components than depicted in FIG. 3. Alternatively, or additionally, one or more components of network portion 300 may perform one or more other tasks described as being performed by one or more other components of network portion 300.

Figure 4:
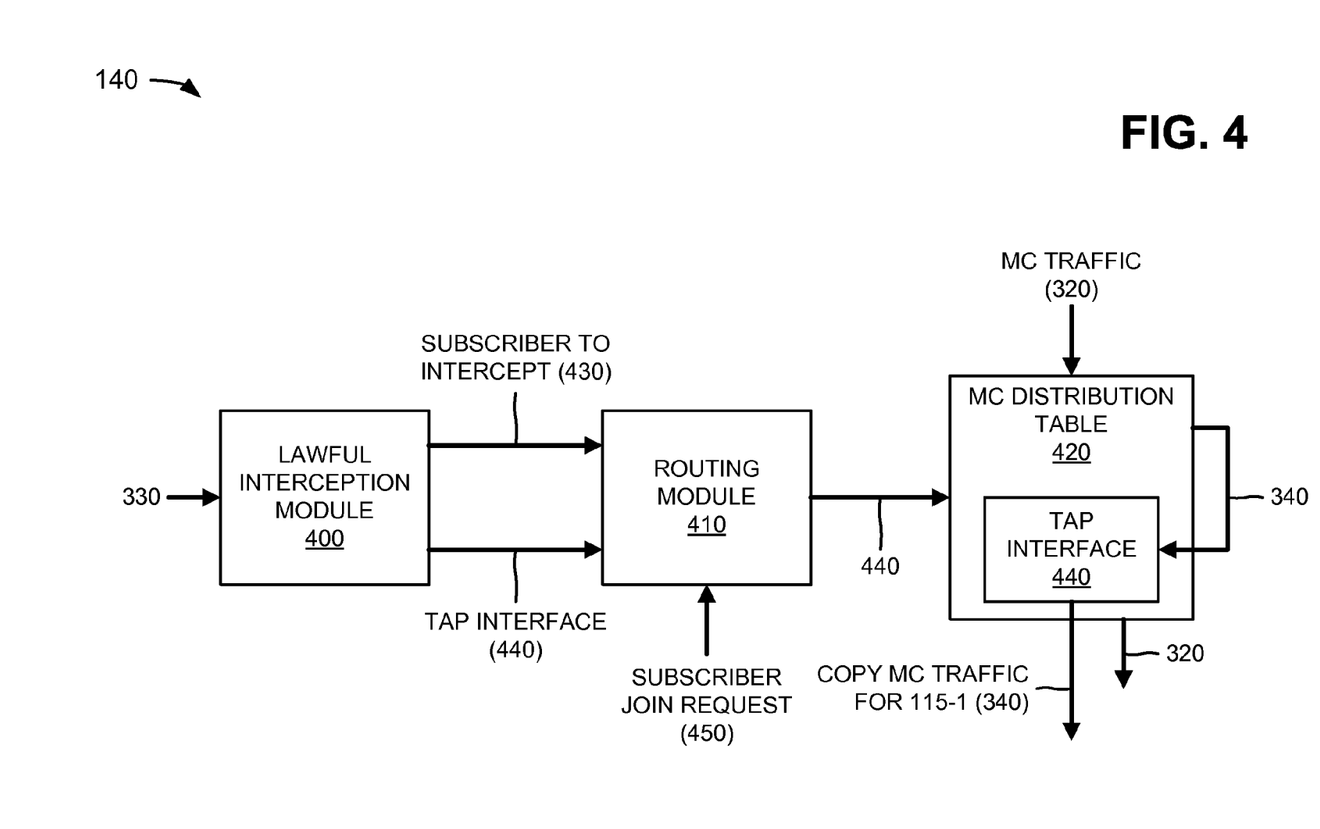
FIG. 4 is a diagram of example functional components of the network device depicted in FIG. 1.

FIG. 4 is a diagram of example functional components of network device 140. As shown, network device 140 may include a lawful interception module 400, a routing module 410, and a multicast (MC) distribution table 420. In one example implementation, one or more of the functional components described in connection with FIG. 4 may be implemented by one or more of the example components of device 200 (FIG. 2).

Lawful interception module 400 may receive interception request 330, for subscriber 115-1, from mediation device 150, and may interact with routing module 410 based on interception request 330. For example, lawful interception module 400 may provide, to routing module 410, information 430 about the subscriber (e.g., subscriber 115-1) to intercept based on interception request 330. Information 430 may include subscriber specific information, such as a name, an address, a telephone number, an account number, etc. associated with subscriber 115-1; information associated with UE 110-1, such as a device type, a telephone number, an IP address, etc. associated with UE 110-1; etc. Lawful interception module 400 may also provide a tap interface 440, corresponding to subscriber 115-1, to routing module 410.

Routing module 410 may receive information 430 about subscriber 115-1 and tap interface 440 from lawful interception module 400. Routing module 410 may also receive a subscriber join request 450 from UE 110-1 associated with subscriber 115-1. Subscriber join request 450 may include the features described above in connection with MC requests 310 (FIG. 3). When routing module 410 receives subscriber join request 450, routing module 410 may insert tap interface 440 in multicast distribution table 420 as an outgoing or forwarding interface. Tap interface 440 may have access to information 430 about subscriber 115-1.

Multicast distribution table 420 may receive multicast traffic 320 requested by subscriber join request 450, may create multicast traffic copy 340 from multicast traffic 320, and may provide multicast traffic copy 340 to tap interface 440. Based on information 430, tap interface 440 may add subscriber specific information, such as headers, to multicast traffic copy 340, and may forward multicast traffic copy 340 to mediation device 150. Mediation device 150 may forward multicast traffic copy 340 to law enforcement device 160, and law enforcement device 160 may perform further lawful interception processing on multicast traffic copy 340. As further shown in FIG. 4, multicast distribution table 420 may forward multicast traffic 320 to UE 110-1 associated with subscriber 115-1.

Although FIG. 4 shows example functional components of network device 140, in other implementations, network device 140 may include fewer functional components, different functional components, differently arranged functional components, or additional functional components than depicted in FIG. 4. Alternatively, or additionally, one or more functional components of network device 140 may perform one or more other tasks described as being performed by one or more other functional components of network device 140.

Figure 5:
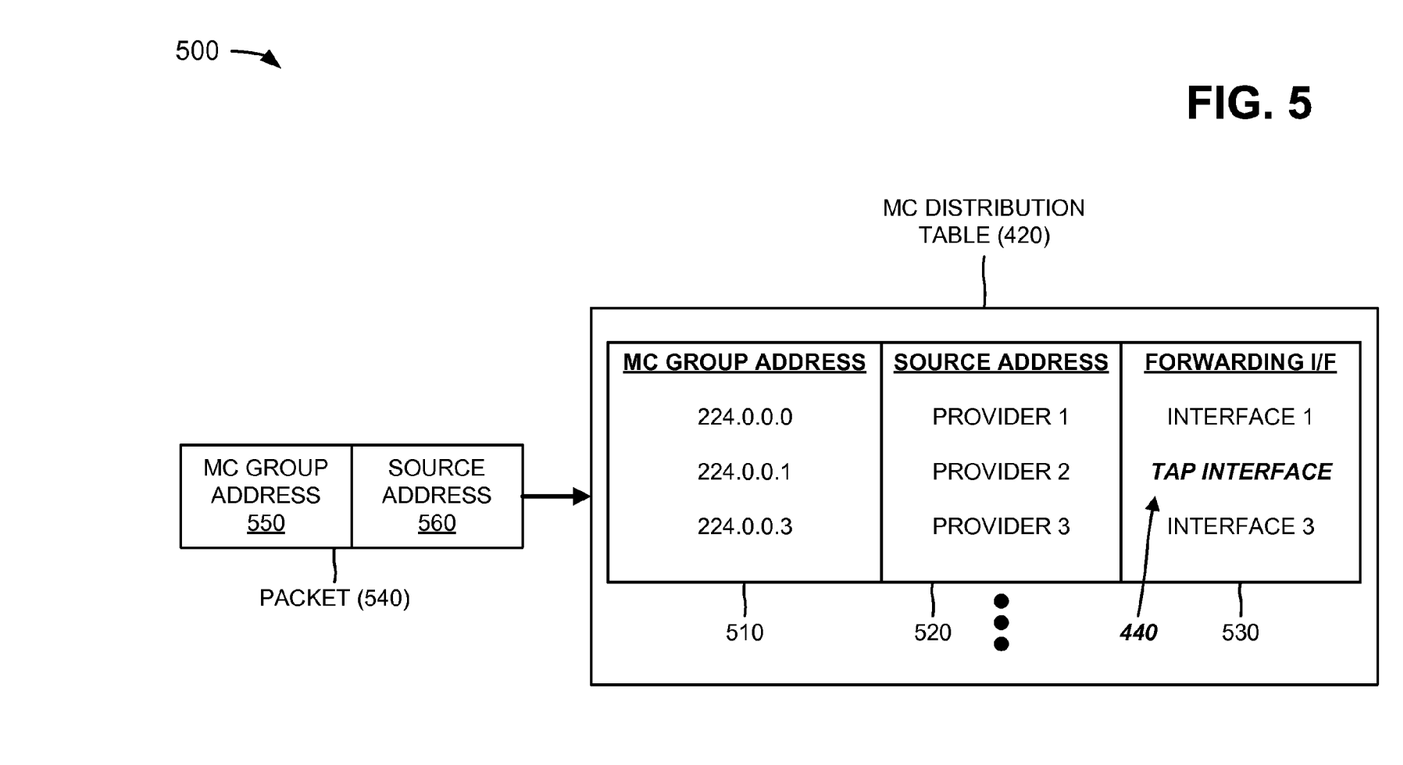
FIG. 5 is a diagram of example information capable of being maintained by a multicast distribution table depicted in FIG. 4.

FIG. 5 is a diagram of example information 500 capable of being maintained by multicast distribution table 420 and/or logic used to operate on information 500. As shown, multicast distribution table 420 may include a multicast (MC) group address field 510, a source address field 520, and a forwarding interface (I/F) field 530. In one example implementation, information 500 may be stored in one or more memories associated with one or more of the example components of device 200 (FIG. 2).

Multicast group address field 510 may include entries for multicast group addresses associated with multicast groups provided by provider device 120. The multicast group addresses may include logical identifiers for groups of host devices in a network (e.g., network 100), that are available to process packets intended for a designated network service. As shown in FIG. 5, multicast group address field 510 may include entries, such as 224.0.0.0, 224.0.0.1, and 224.0.0.3.

Source address field 520 may include entries for source addresses of provider devices associated with multicast group addresses provided in multicast group address field 510. For example, as shown in FIG. 5, a source address corresponding to a first provider device (PROVIDER 1) may be associated with entry 224.0.0.0 of multicast group address field 510; a source address corresponding to a second provider device (PROVIDER 2) may be associated with entry 224.0.0.1 of multicast group address field 510; and a source address corresponding to a third provider device (PROVIDER 3) may be associated with entry 224.0.0.3 of multicast group address field 510.

Forwarding interface field 530 may include entries for forwarding interfaces associated with multicast group addresses provided in multicast group address field 510. For example, as shown in FIG. 5, a first interface (INTERFACE 1) may be associated with entry 224.0.0.0 of multicast group address field 510; tap interface 440 may be associated with entry 224.0.0.1 of multicast group address field 510; and a third interface (INTERFACE 3) may be associated with entry 224.0.0.3 of multicast group address field 510.

As further shown in FIG. 5, a packet 540, destined for subscriber 115-1 to be intercepted, may include a multicast group address 550 (e.g., in a destination address) and a source address 560. Assuming multicast group address 550 corresponds to address 224.0.0.1, multicast distribution table 420 may receive packet 540, may create a copy of packet 540, and may provide the copy of packet 540 to tap interface 440. Tap interface 440 may add subscriber 115-1 specific information, such as headers, to the copy of packet 540, and may forward the copy of packet 540 to mediation device 150. Mediation device 150 may forward the copy of packet 540 to law enforcement device 160, and law enforcement device 160 may perform further lawful interception processing on the copy of packet 540. Multicast distribution table 420 may also forward packet 540 to UE 110-1 associated with subscriber 115-1.

Although FIG. 5 shows example information 500 that may be maintained in multicast distribution table 420, in other implementations, multicast distribution table 420 may include less information, different information, differently arranged information, or additional information than depicted in FIG. 5.

Figure 6:
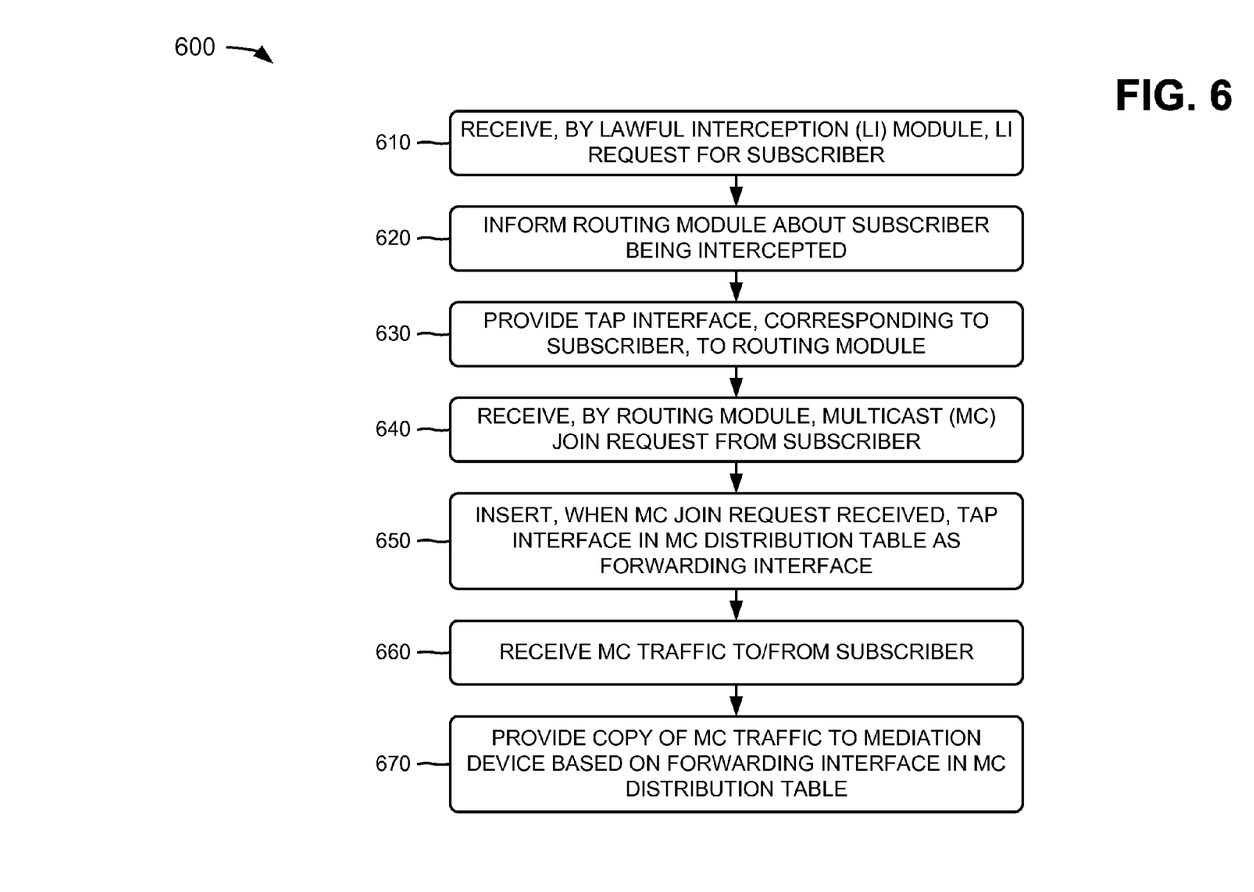
FIGS. 6 and 7 are flow charts of an example process for performing lawful interception of multicast traffic received by a subscriber according to an implementation described herein.
Figure 7:
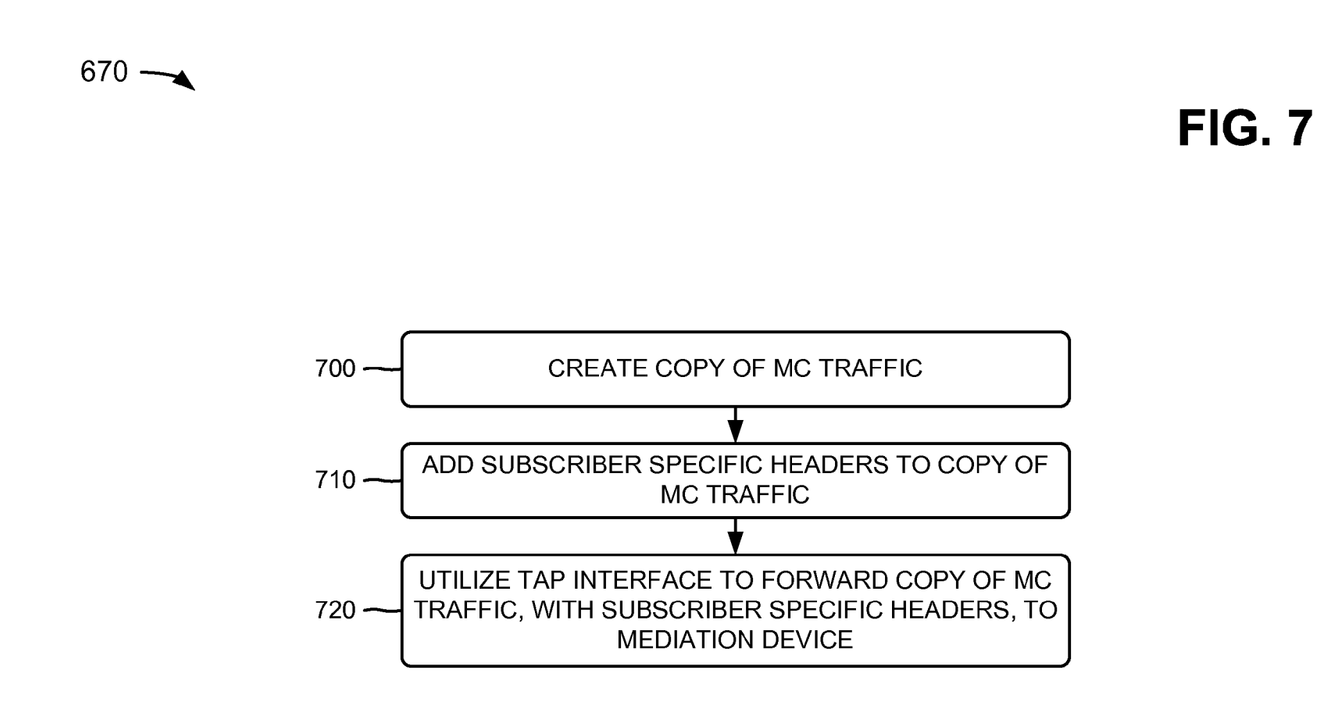

FIGS. 6 and 7 are flow charts of an example process 600 for performing lawful interception of multicast traffic received by a subscriber according to an implementation described herein. In one implementation, process 600 may be performed by network device 140. In another implementation, some or all of process 600 may be performed by one or more devices other than network device 140 or in combination with network device 140. One or more of the process blocks depicted in FIGS. 6 and 7 may be performed concurrently and independently of one or more other process blocks.

As illustrated in FIG. 6, process 600 may include receiving, by a lawful interception (LI) module, a lawful interception request for a subscriber (block 610), and informing a routing module about the subscriber being intercepted (block 620). For example, in an implementation described above in connection with FIG. 3, mediation device 150 may provide interception request 330 for a particular subscriber (e.g., subscriber 115-1) to network device 140. Interception request 330 may include a request to perform lawful interception of some or all traffic (e.g., unicast traffic and multicast traffic) flowing to and from subscriber 115-1, via UE 110-1. Interception request 330 may also include subscriber specific information, such as a name, an address, a telephone number, an account number, etc. associated with subscriber 115-1; information associated with UE 110-1 of subscriber 115-1, such as a device type, a telephone number, an IP address, etc. associated with UE 110-1; etc. The lawful interception module of network device 140 may receive interception request 330, and may inform the routing module about the subscriber (e.g., subscriber 115-1) identified in interception request 330.

As further shown in FIG. 6, process 600 may include providing a tap interface, corresponding to the subscriber, to the routing module (block 630), receiving, by the routing module, a multicast join request from the subscriber (block 640), and inserting, when the multicast join request is received, the tap interface in a multicast distribution table as a forwarding interface (block 650). For example, in an implementation described above in connection with FIG. 3, the lawful interception module may provide an interface (e.g., a tap interface), corresponding to subscriber 115-1, to the routing module. In one example, the interface may direct a copy of traffic, provided to or from subscriber 115-1, to mediation device 150. When the routing module of network device 140 receives multicast request 310 (e.g., an IGMP join request) from subscriber 115-1, the routing module may insert the interface, corresponding to subscriber 115-1, as an outgoing or forwarding interface of the multicast distribution table.

Returning to FIG. 6, process 600 may include receiving multicast traffic provided to or received from the subscriber (block 660), and providing a copy of the multicast traffic to a mediation device based on the forwarding interface in the multicast distribution table (block 670). For example, in an implementation described above in connection with FIG. 3, if network device 140 receives multicast traffic 320 provided to or from subscriber 115-1, via UE 110-1, network device 140 may provide copy 340 of multicast traffic 320 to the tap interface provided in the multicast distribution table. Network device 140 (e.g., via the tap interface) may forward multicast traffic copy 340 to mediation device 150.

Process block 670 may include the process blocks depicted in FIG. 7. As shown in FIG. 7, process block 670 may include creating the copy of the multicast traffic (block 700), adding subscriber specific headers to the copy of the multicast traffic (block 710), and utilizing the tap interface to forward the copy of the multicast traffic, with the subscriber specific headers, to the mediation device (block 720). For example, in an implementation described above in connection with FIG. 4, multicast distribution table 420 of network device 140 may receive multicast traffic 320 requested by subscriber join request 450, may create multicast traffic copy 340 from multicast traffic 320, and may provide multicast traffic copy 340 to tap interface 440. Tap interface 440 may add subscriber specific information, such as headers, to multicast traffic copy 340, and may forward multicast traffic copy 340 to mediation device 150.

Systems and/or methods described herein may perform lawful interception of multicast traffic received by a particular subscriber via a network device. The network device may include a lawful interception module and a routing module. In order to intercept a multicast stream received by the particular subscriber, the lawful interception module may receive an explicit request to intercept a particular multicast stream or the lawful interception module may interact with the routing module to obtain information related to an IGMP join request by the particular subscriber.

The term component, as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a lawful interception module of a network device and from a particular device, a lawful interception request for a subscriber;
informing, by the lawful interception module, a routing module of the network device about the subscriber;
providing, by the lawful interception module and to the routing module, information identifying an interface corresponding to the subscriber;
receiving, by the routing module, a multicast join request from the subscriber; and
inserting, by the routing module and when the multicast join request is received, the information identifying the interface into a multicast distribution table, of the network device, as a forwarding interface,
the multicast distribution table including:
a first field including a first entry for a multicast group address associated with a provider,
a second field including a second entry for a source address associated with the provider, and
a third field including a third entry for the forwarding interface,
the forwarding interface being associated with the multicast group address of the first entry,
the provider providing multicast traffic intended for the subscriber, and
the forwarding interface directing a copy of the multicast traffic, intended for the subscriber, to the particular device that provided the lawful interception request to the lawful interception module.

2. The method of claim 1, where the interface includes a tap interface.

3. The method of claim 1,
where the particular device includes a mediation device, and
where the method further comprises:
receiving, from the provider, the multicast traffic intended for the subscriber; and
providing the copy of the multicast traffic to the mediation device based on the forwarding interface in the third field of the multicast distribution table.

4. The method of claim 3, where providing the copy of the multicast traffic to the mediation device comprises:
creating the copy of the multicast traffic;
adding subscriber specific information, associated with the subscriber, to the copy of the multicast traffic; and
utilizing the interface to forward the copy of the multicast traffic, with the subscriber specific information, to the mediation device.

5. The method of claim 3, further comprising:
providing the multicast traffic to a device associated with the subscriber.

6. The method of claim 1, where the multicast join request includes an Internet group management protocol (IGMP)-based join request.

7. The method of claim 1, where the multicast join request includes an Internet Control Message Protocol (ICMP)-based request.

8. A network device comprising:
a multicast distribution table including:
a first field including a first entry for a multicast group address associated with a provider, a second field including a second entry for a source address associated with the provider, and a third field including a third entry for a forwarding interface associated with the multicast group address of the first entry;

a routing module; and a lawful interception module to:
- receive, from a particular device, a lawful interception request for a subscriber,
- inform the routing module about the subscriber based on the lawful interception request, and
- provide, to the routing module, information identifying an interface corresponding to the subscriber, the routing module to:
- receive a multicast join request from the subscriber, and
- insert, when the multicast join request is received, the information identifying the interface into the third entry of the multicast distribution table as the forwarding interface,
    - the provider providing the multicast traffic intended for the subscriber, and
    - the forwarding interface directing a copy of the multicast traffic, intended for the subscriber, to the particular device that provided the lawful interception request to the lawful interception module.

9. The network device of claim 8, where the interface includes a tap interface.

10. The network device of claim 8,
where the particular device includes a mediation device, and
where the multicast distribution table is to:
- receive the multicast traffic intended for the subscriber, and
- provide the copy of the multicast traffic to the mediation device based on the forwarding interface in the third field of the multicast distribution table.

11. The network device of claim 10, where, when providing the copy of the multicast traffic to the mediation device, the multicast distribution table is to:
- create the copy of the multicast traffic,
- add subscriber specific information, associated with the subscriber, to the copy of the multicast traffic, and
- utilize the interface to forward the copy of the multicast traffic, with the subscriber specific information, to the mediation device.

12. The network device of claim 10, where the multicast distribution table is further to:
- provide the multicast traffic to a device associated with the subscriber.

13. The network device of claim 8, where the multicast join request includes an Internet group management protocol (IGMP)-based join request.

14. The network device of claim 8, where the multicast join request includes an Internet Control Message Protocol (ICMP)-based request.

15. A non-transitory computer-readable medium storing instructions, the instructions comprising:
one or more instructions that, when executed by at least one processor, cause the at least one processor to:
- receive, from a particular device, a lawful interception request for a subscriber;
- inform a routing module about the subscriber based on the lawful interception request;
- provide, to the routing module, information identifying an interface corresponding to the subscriber;
- receive a multicast join request from the subscriber; and
- insert, when the multicast join request is received, the information identifying the interface into a multicast distribution table as a forwarding interface,
    the multicast distribution table including:
    - a first field including a first entry for a multicast group address associated with a provider of multicast traffic intended for the subscriber,
    - a second field including a second entry for a source address associated with the provider, and
    - a third field including a third entry for the forwarding interface,
        - the forwarding interface being associated with the multicast group address of the first entry, and
        - the forwarding interface directing a copy of the multicast traffic, intended for the subscriber, to the particular device that provided the lawful interception request to the lawful interception module.

16. The non-transitory computer-readable medium of claim 15, where the interface includes a tap interface.

17. The non-transitory computer-readable medium of claim 15,
where the particular device includes a mediation device, and
where the instructions further comprise:
one or more instructions that, when executed by the at least one processor, cause the at least one processor to:
- receive, from the provider, the multicast traffic intended for the subscriber; and
- provide the copy of the multicast traffic to the mediation device based on the forwarding interface provided in the third field of the multicast distribution table.

18. The non-transitory computer-readable medium of claim 17, where the one or more instructions to provide the copy of the multicast traffic include:
one or more instructions that, when executed by the at least one processor, cause the at least one processor to:
- create the copy of the multicast traffic;
- add subscriber specific information, associated with the subscriber, to the copy of the multicast traffic; and
- utilize the interface to forward the copy of the multicast traffic, with the subscriber specific information, to the mediation device.

19. The non-transitory computer-readable medium of claim 17, where the instructions further comprise:
one or more instructions that, when executed by the at least one processor, cause the at least one processor to:
- provide the multicast traffic to a device associated with the subscriber.

20. The non-transitory computer-readable medium of claim 15, where the multicast join request includes one of:
- an Internet group management protocol (IGMP)-based join request, or
- an Internet Control Message Protocol (ICMP)-based request.

* * * * *